(12) United States Patent
Whitehead et al.

(10) Patent No.: US 6,395,978 B1
(45) Date of Patent: May 28, 2002

(54) ELECTRICAL FLOOR BOX ASSEMBLY FOR DIVIDING POWER AND COMMUNICATION WIRES

(75) Inventors: James H. Whitehead, Collierville; Mark Drane, Germantown, both of TN (US)

(73) Assignee: Thomas & Betts International, Inc., Sparks, NV (US)

( * ) Notice: Subject to any disclaimer, the term of this patent is extended or adjusted under 35 U.S.C. 154(b) by 0 days.

(21) Appl. No.: 09/592,392

(22) Filed: Jun. 13, 2000

Related U.S. Application Data
(60) Provisional application No. 60/139,296, filed on Jun. 15, 1999.

(51) Int. Cl.[7] .................................................. H01J 15/00
(52) U.S. Cl. ........................... 174/50; 174/58; 174/60; 220/3.2; 52/220.5
(58) Field of Search ....................... 174/48, 50, 49, 174/50.55, 50.56, 50.6, 50.62, 58, 60, 57, 64; 220/3.2, 3.6, 3.8, 3.92, 3.94, 3.7, 533; 52/220.5

(56) References Cited

U.S. PATENT DOCUMENTS

| | | |
|---|---|---|
| 3,061,663 A | 10/1962 | Reiland |
| 3,472,945 A | 10/1969 | Trachtenberg |
| 3,587,906 A | 6/1971 | Pepe |
| 3,646,244 A | 2/1972 | Cole |
| 3,784,042 A | 1/1974 | Hadfield et al. |
| 3,956,573 A | 5/1976 | Myers et al. |
| 4,091,231 A | 5/1978 | Sotolongo |
| 4,165,443 A | 8/1979 | Figart et al. |
| 4,209,660 A | 6/1980 | Flachbarth et al. |
| 4,243,835 A | 1/1981 | Ehrenfels |
| 4,264,779 A | 4/1981 | Rhodes et al. |
| 4,331,832 A | 5/1982 | Curtis et al. |
| 4,336,416 A | 6/1982 | Goodsell |
| 4,477,694 A | 10/1984 | Kohaut |
| 4,536,612 A * | 8/1985 | Domigan ..................... 174/48 |
| 4,551,577 A | 11/1985 | Byrne |
| 4,661,652 A | 4/1987 | Benscoter |
| 4,745,717 A | 5/1988 | Domigan |
| 4,780,571 A | 10/1988 | Huang |
| 5,003,127 A | 3/1991 | Sosinski et al. |
| 5,032,690 A | 7/1991 | Bloom |
| 5,107,072 A | 4/1992 | Morgan |
| 5,148,942 A * | 9/1992 | Snook ......................... 220/533 |
| 5,190,212 A * | 3/1993 | Morris ........................ 229/120 |
| 5,225,214 A * | 7/1993 | Filion .......................... 425/434 |
| 5,243,129 A | 9/1993 | Bates et al. |
| 5,420,376 A | 5/1995 | Rajecki et al. |
| 5,466,886 A | 11/1995 | Lengyel et al. |
| 5,486,650 A * | 1/1996 | Yetter .......................... 174/53 |
| 5,594,207 A * | 1/1997 | Fabian et al. ................ 174/58 |
| 5,700,977 A * | 12/1997 | Ford et al. ................... 174/64 |
| 5,783,774 A * | 7/1998 | Bowman et al. ............. 174/48 |
| 6,194,658 B1 * | 2/2001 | Duval .......................... 174/64 |

OTHER PUBLICATIONS

Carlton Electrical Products, *Floor Box & Divider Kit*, Lamson & Sessions 1996.
Walker™, A Wiremold Company, *Ratchet–Pro™*, ©1997 The Wiremold Company.

\* cited by examiner

*Primary Examiner*—Dean A Reichard
*Assistant Examiner*—Dhiru R Patel
(74) *Attorney, Agent, or Firm*—Hoffmann & Baron, LLP (57) ABSTRACT

An infloor electrical outlet box selectively supports power and data/communication wires therein. The outlet box is positionable within the floor and includes a plurality of access ports for providing separate selective entry of power and data/communication wires into the box. A service divider is movably insertable into the box interior. The service divider provides for separation as between the power and data/communication wires. An activation member is positioned at the open upper end of the box for supporting power receptacles and data/communication receptacles for terminating the respective wires.

16 Claims, 7 Drawing Sheets

ELECTRICAL FLOOR BOX ASSEMBLY FOR DIVIDING POWER AND COMMUNICATION WIRES

This application claims the benefit of U.S. Provisional Application No. 60/139,296, filed on Jun. 15, 1999.

FIELD OF THE INVENTION

The present invention relates generally to an electrical outlet box which houses power and communication wires for termination. More specifically, the present invention relates to an electrical floor box assembly having a divider for effectively isolating power wires from communication wires within the floor box.

BACKGROUND OF THE INVENTION

It is well known to use electrical outlet boxes to terminate electrical wires and cables. Such outlet boxes typically provide for the termination of the wires and cables to electrical receptacles, jacks and plugs and other termination devices. Certain of these outlet boxes, referred to as floor boxes, are designed to be supported within a poured concrete floor. One of the problems in positioning a floor box is that the installer must assure that the floor box is both flush and level with the top of the poured floor in which it is set.

In the prior art, it is known to provide floor boxes which are set in poured concrete floors and then sawed off to accommodate the depth of the poured floor. Examples of these cuttable floor boxes are shown in U.S. Pat. Nos. 3,343,704 to Terry and 5,466,886 to Lengyel et al. However, these cuttable floor boxes have certain disadvantages. The cuttable floor boxes typically have an open end and thus require a separate cover to protect the interior of the box from debris and extraneous concrete during pouring of the concrete floor. Furthermore, many of these cuttable floor boxes require complicated activation assemblies to assure that the terminations housed at the upper end of the box are level with the concrete floor.

Additionally, certain electrical standards such as those promulgated by the National Electrical Code (NEC) also require that floor boxes which accommodate multiple services such as power and communication services, be designed to maintain physical separation between the various services within the box.

Prior art floor boxes such as that shown in the above-referenced '886 patent and U.S. Pat. No. 5,783,774 to Bowman et al. require complicated assemblies to be placed within the floor box so as to maintain adequate physical separation between the different services within the box. These prior art devices require accurate measurement and cutting of the divider used to separate the power and communications wires. Also, the activation ring which supports the terminations must be fixed to the top of the box by cumbersome securement techniques such as adhesives, adjustable screws, clips or ratchet pawls. Finally, floor boxes of the prior art fixed the dividers or partitions in a particular orientation thereby dictating the orientation and arrangement of the power and communications wires entering and exiting the floor box.

It is therefore desirable to provide a floor box for use within the poured concrete floor which effectively partitions data/communication wires from power wires and which is easy to assemble and more versatile to use.

SUMMARY OF THE INVENTION

It is therefor an object of the present invention to provide an infloor outlet box which accommodates and separates the power wires and data/communication wires.

It is a further object of the present invention to provide an infloor outlet box which allows selectivity in inserting power wires and data/communication wires into the box.

It is still a further object of the present invention to provide a service divider which is selectively positionable within the outlet box for separating the power wires and data/communication wires therein.

In the efficient attainment of these and other objects, the present invention provides an infloor electrical outlet box assembly which accommodates and separates power wires and data/communication wires. The box assembly includes an outlet box positionable within a floor. The outlet box includes a base, an opposed open end and a perimetrical side wall therebetween defining a box interior. The box includes a plurality of access ports adjacent the base for providing separate entry of power and data/communication wires into the interior of the box.

A service divider is movably inserted into the box interior. The service divider includes an arch-shaped base defining a tunnel selectively alignable upon the movable insertion of the service divider with at least one of the access ports so as to accommodate data/communication wires within the tunnel. The power wires are accommodated over the arch-shaped base. The service divider further includes an upstanding divider wall extending from the base towards the upper end of the box. The divider provides continued separation between the power wires and the data/communication wires.

An activation member is fixably positioned at the open upper end of the box for supporting both power receptacles and data/communication receptacles for terminating the power wires and data/communication wires. The activation member includes a depending divider wall for positioning in side-by-side registration with a portion of the upstanding divider wall so as to maintain physical separation between the power wires and the data/communication wires. Also, the activation member fixes the position of the service divider within the box interior.

As more particularly described by way of a preferred embodiment herein, the outlet box is generally in the shape of an open ended cylinder having a circular base. The activation member is in the form of a ring defining a ring wall which is insertable against the interior of the cylindrical side wall of the box. The ring wall of the activation ring includes a plurality of retaining clips extending therefrom which provides for the non-movable positioning of the activation ring within the outlet box. This is provided by the retaining clips extending for biting engagement with the interior cylindrical side wall of the outlet box.

Also, in a preferred embodiment, the service divider includes a pair of spaced apart divider walls extending upwardly from the arch-shaped base. The pair of divider walls define a central compartment therebetween for accommodating power wires and a pair of lateral compartments between the divider walls and the cylindrical side wall for accommodating data/communication wires. The activation ring would therefore include a pair of spaced apart depending divider walls for positioning in side-by-side registration the upstanding divider walls of the service divider.

In the preferred embodiment, the service divider includes a pair of hermaphroditic attachably coupled divider members. Each divider member includes an arch-shaped component and an upstanding divider wall. The arch-shaped component of one of the pairs is attachable to the arch-shaped component of the other pair to form the divider.

DETAILED DESCRIPTION OF THE PREFERRED EMBODIMENTS

The present invention provides an electrical outlet box assembly, more particularly electrical floor box assembly, which employs a divider which allows the use of various ports of the floor box to feed either power or data/communication wires to terminations attached to the top of the floor box. The divider may have one or two sets of vertical walls for the purpose of separation. The divider is supported within the floor box by using an activation ring to hold the divider securely in place. The activation ring includes a depending vertical wall to permit vertical adjustability and includes a set of wedge clips which provides for securement of the activation ring within the floor box without use of adhesives or complicated mechanical fasteners.

Figure 1:
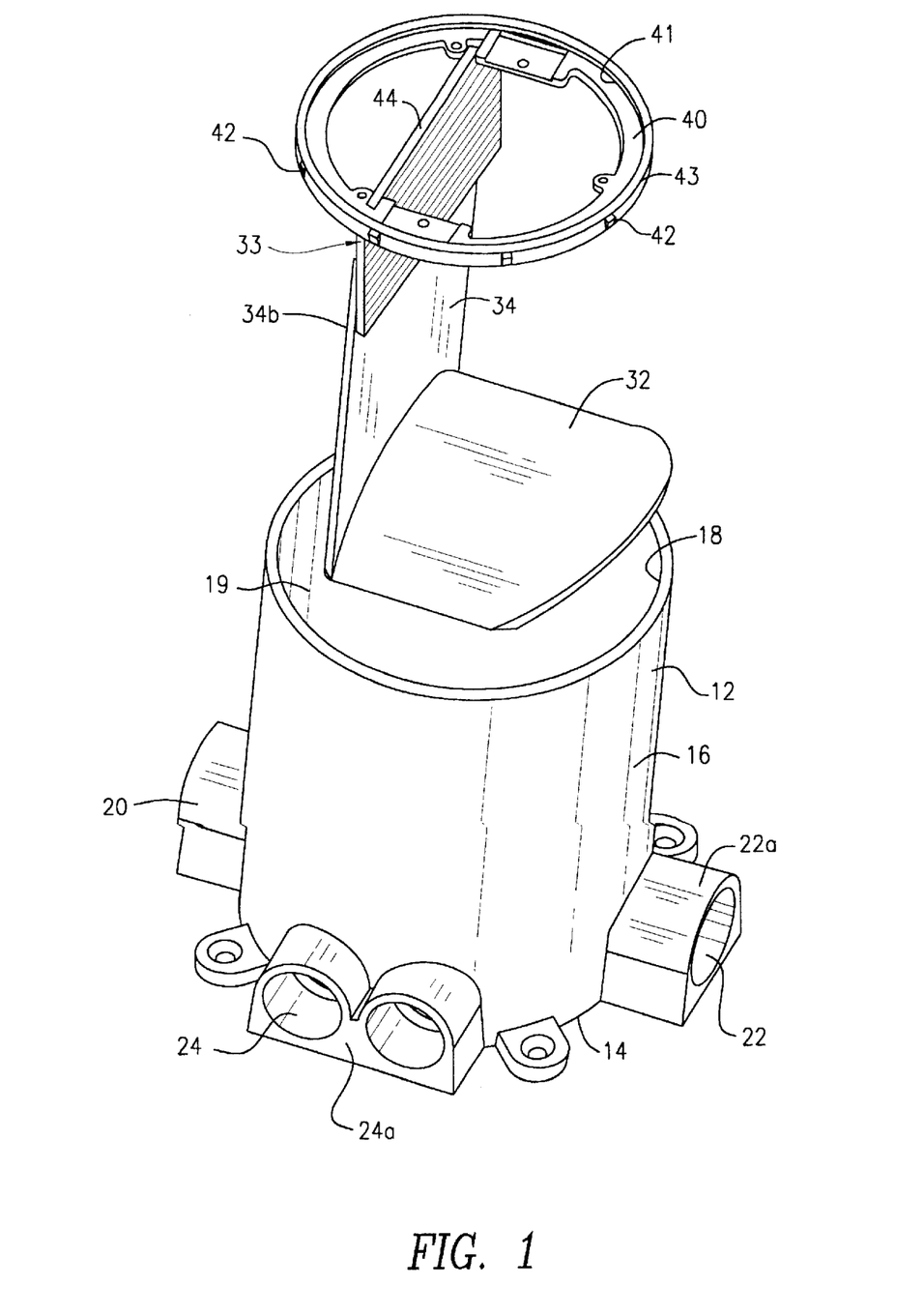
FIG. 1 is an exploded perspective in view of a first embodiment of the floor box assembly present invention.

Referring to FIG. 1, one embodiment of the floor box assembly of the present invention is shown. Floor box assembly 10 includes an electrical floor box housing 12. Floor box housing 12 includes a bottom wall 14 and upstanding cylindrical wall 16 terminating in a circular open end 18. Floor box housing 12 defines a housing interior 19 which permits the termination of both power and data/communication wires therein. Access to the interior 19 of floor box housing 12 for such wires is provided by ports 20 which extend through cylindrical wall 16 adjacent bottom wall 14. A plurality of ports 20 are shown which are circumferentially positioned about cylindrical side wall 16. Each port 20 includes a surrounding hub which allows for termination of conduit thereto which feeds the wires into floor box housing 12. As shown in FIG. 1, the ports 20 are generally provided in two configurations. A pair of first ports 22 are positioned on diametrically opposite sides of the housing 12. Ports 22 each include a single hub 22a therearound. A pair of second ports 24, which are duplex ports, extend on diametrically opposite sides of housing 12. Ports 24 each include a duplex hub 24a therearound.

Floor box housing 12 may be formed of a suitable plastic material such as polyvinylcloride (PVC) and may be formed in a wide variety of known plastic forming techniques.

Figure 1A:
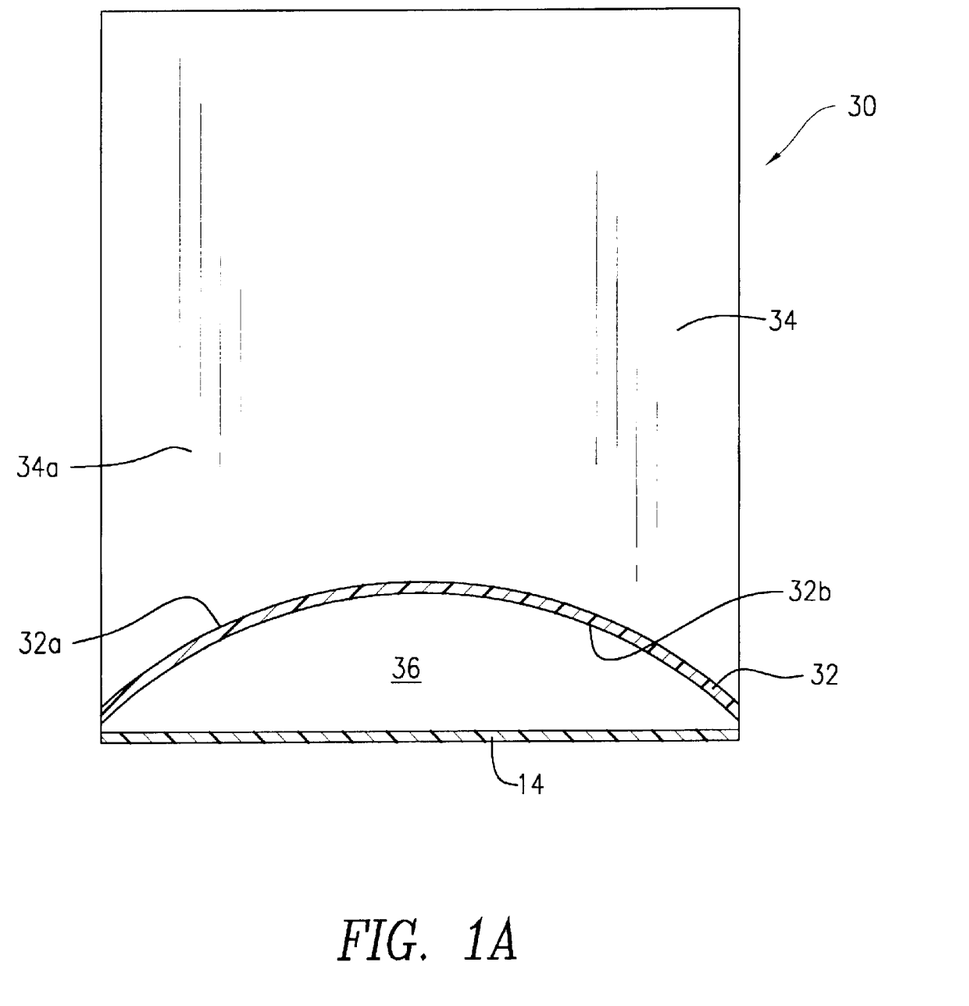
FIG. 1A is a partial sectional showing of the divider of the assembly of FIG. 1.

Referring additionally to FIG. 1A, in order to provide sufficient separation between various services housed within floor box housing 12, floor box assembly 10 further includes a service divider 30. Divider 30, which may also be formed of PVC, includes a arch-shaped base 32 and an upstanding vertical wall 34 extending therefrom. Divider 30 defines two separate wire accommodating areas. Upper arched surface 32a and adjacent wall surface 34a are opposed to lower arch surface 32b and wall surface 34b. The arch-shaped base 32 defines a tunnel 36 through which one type of service wire may be extended. When positioned within floor box housing 12, vertical wall 34 extends toward the upper open end 18 thereof to divide the interior 19 of floor box housing 12 into compartments which individually retain and separate the various different services which may be housed within floor box assembly 10.

In order to support electrical terminations (not shown) such as power receptacles, data and communications, jacks and plugs, the present invention provides an activation ring assembly 40 which may be supported at the open upper end 18 of floor box housing 12. The activation ring assembly 40 includes an activation ring 41 which is typically formed of metal, preferably die cast zinc. The ring 41 is generally of annular configuration and is designed to fit in frictional retention in the circular open end 18 of floor box housing 12. Activation ring assembly 40 includes a plurality of circumferentially disposed outwardly radially extending wedge clips 42, secured to a side wall 43 of ring 41, which extend for biting frictional engagement with the interior surface of cylindrical side wall 16 adjacent open upper end 18. The clips 42 which may be formed of stainless, steel dig into the plastic wall of floor box housing 12 to accurately and permanently set activation ring assembly 40 at the open upper end thereof without the need for adhesives or other complicated and adjustable mechanical fasteners. The stainless steel wedge clips employed in the present invention are of the type disclosed and claimed in U.S. Pat. No. 5,627,340 issued May 6, 1997 entitled Floor Box with Improved Activation Ring which is incorporated by reference herein for all purposes.

The activation ring assembly 40 further includes depending vertical wall 44 integrally formed with ring 41, which when supported in floor box housing 12 extends towards the upper end 33 of vertical wall 34. The depending wall 44 of the activation ring 41 and the upper end 33 of vertical wall 34 overlap so as to provide continuous division from bottom wall 14 of floor box housing 12 to the activation ring 42 adjacent open upper end 18. Furthermore, as the activation ring is positionable in floor box 12 at varied positions with respect to upper end 18, the depending wall 44 assures at least partial overlap with vertical wall 34 at any position.

The present invention provides complete separation between compartments which can accommodate different types of service. Furthermore, the present invention allows flexibility in that prior to attachment of the activation ring, the divider can be rotated so as to accommodate the different types of service which may be inserted from different selected ports. In one example, with the divider positioned as shown in FIG. 1, data/communication wires are accommodated through ports 22 through tunnel 36 and up along the space defined between surface 34b of upstanding wall 34 and the adjacent interior side wall of box 12 thereadjacent. The data/communication wires may extend through the activation ring for termination to data/communications terminal such as jacks and plugs mounted thereto. Power wires, which enter box 12 through ports 24, extend over the upper surface 32a of arch-shaped base 32 and upwards in the region defined between surface 34a of upstanding wall 34 and the adjacent interior side wall of box 12. Power wires extend upwardly so as to be terminated by an electrical receptacle supported by an activation ring. The depending wall 44 extends downward and overlaps in side-by-side registration with upper end 33 of upstanding wall 34 so as to maintain continuous separation between these power wires and data/communication wires. As may be appreciated, floor box assembly 1 may be constructed so as to position divider 30 within box 12 so that data/ communication wires may be inserted through ports 24 and through tunnel 36 while power wires may be inserted through ports 22 and over arch-shaped base 32.

Figure 2:
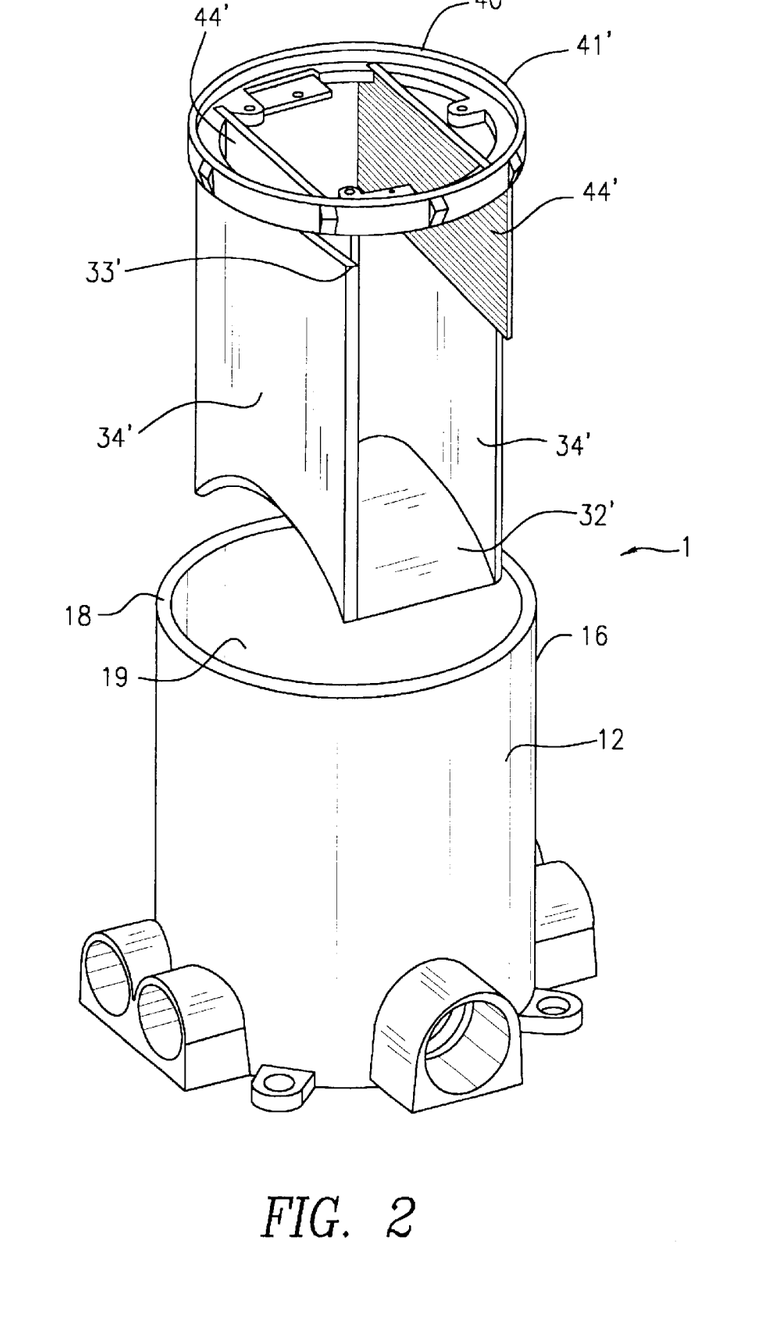
FIG. 2 is an exploded perspective view of a second embodiment of the floor box assembly of the present invention.

Referring now to FIG. 2, a further embodiment of the present invention is shown. The embodiment of FIG. 2 employs a floor box housing 12 of identical construction of that shown in FIG. 1. The divider 30' includes a pair of spaced apart walls 34' extending from arch-shaped base 34. The use of divider 30' provides not only separation between power wires which may be inserted over base shaped arch 32' but also provides two compartments for accommodating data/communication wires, being defined by the walls 34' and the adjacent interior cylindrical side wall of box 12. The activation ring assembly 40' shown in FIG. 2 includes a ring 41' and a pair of spaced apart depending walls 44' each positionable adjacent the upper end 33' of walls 34' so as to continue the duel separation of the divider. As with the embodiment in FIG. 1, the divider 30' shown in FIG. 2 may be positioned within box 12 in a manner where power and/or communication wires may be individually inserted in any of the ports therein.

Referring now to FIGS. 3–6, a preferred embodiment of the present invention is shown. In the preferred embodiment, an improved divider 130 may be used in combination with floor box housing 12 so as to establish and maintain separation between power wires and data/communication wires terminated by floor box assembly 10.

Figure 4:
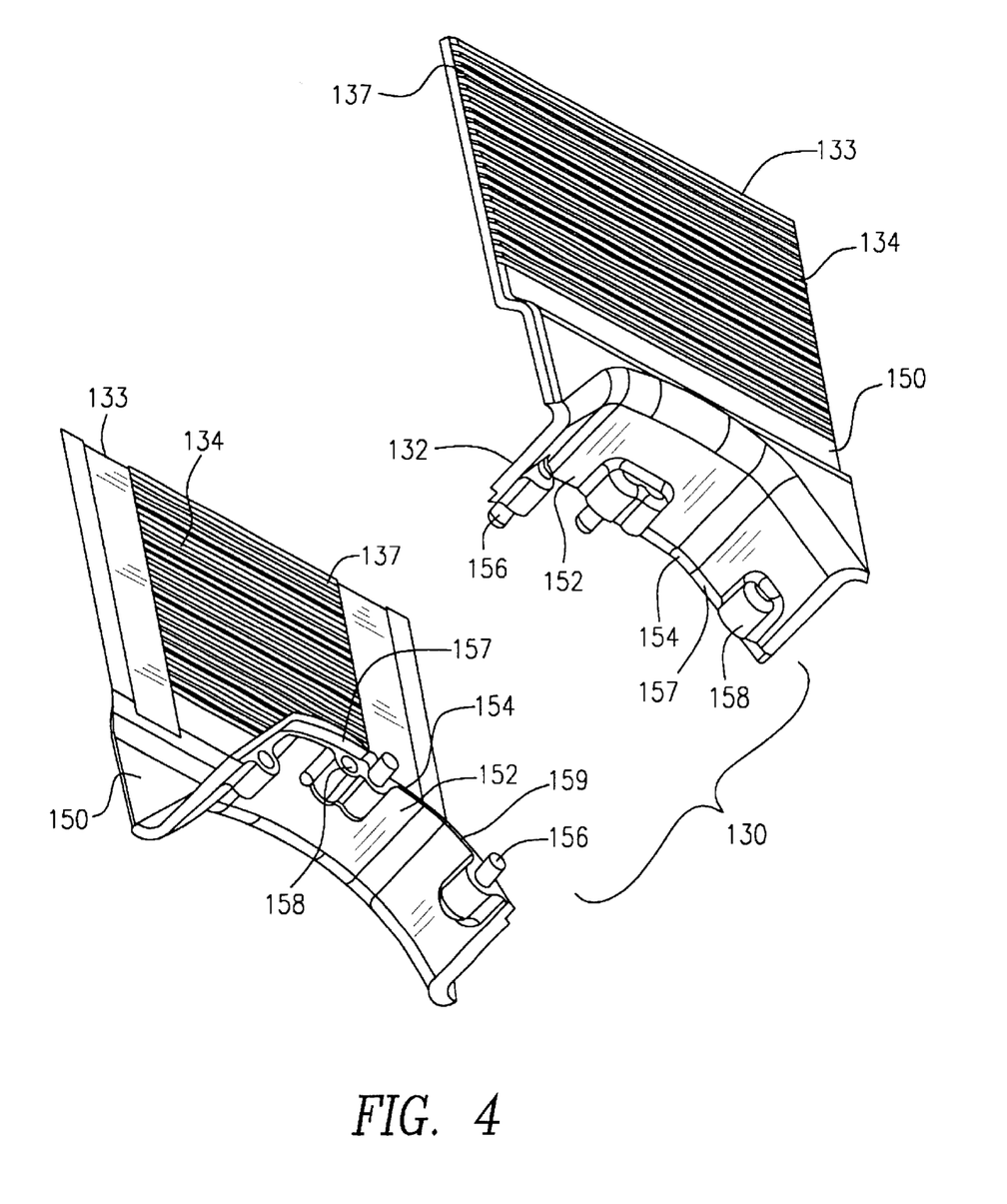
FIG. 4 is an exploded perspective lower view of the divider of the floor box assembly of FIG. 3.

Divider 130, shown also in FIG. 4, includes an arch-shaped base 132 having a pair of upstanding vertical walls 134 extending therefrom. Arch-shaped base 132 includes an upper arch-shaped surface 132a and an opposed lower arch-shaped surface 132b. Upper arch-shaped surface 132a which, together with the inwardly facing surfaces 134a of vertical walls 134, define an interior location for accommodating power wires. Lower arch-shaped surface 132b defines a tunnel 136 which together with the opposed outwardly facing surfaces 134b of vertical wall 134 define locations for accommodating data/communication wires. In this fashion, the divider 130 of FIG. 4 is substantially similar to the divider 30' shown in FIG. 2. In the present embodiment, however, divider 130 is formed by a pair of interfitting hermaphroditic components.

Figure 3:
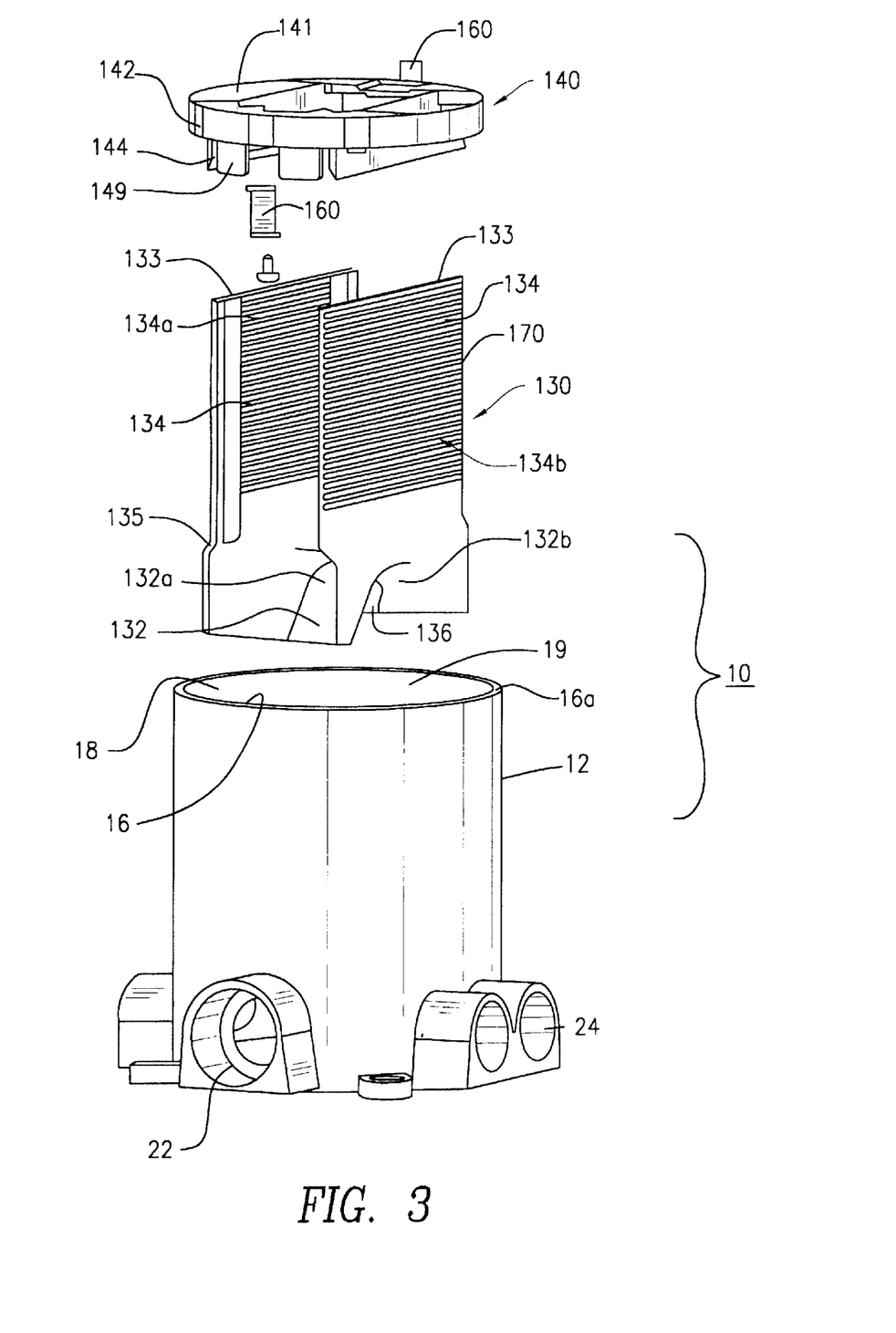
FIG. 3 is an exploded perspective view of a preferred embodiment of the floor box assembly of the present invention.

As particularly shown in FIG. 4, divider 130 is formed by a pair of identically formed, attachably coupled divider members 150. Each divider member 150 includes an arch-shaped component 152 and one upstanding vertical wall 134. The arch-shaped components 152 of two identically formed divider members 150 are assembled together so as to form arch-shaped base 132. In order to provide for the interfitting of divider members 150, each arch-shaped component 152 includes an interconnectable extending connection rim 154. Connection rim 154 of one divider member 150 is designed to interlock with connection rim 154 of the other divider member 150 so as to form divider 130 as shown in FIG. 3. In order to effect locking interconnection between two divider members 150, connection rim 154 includes a series of interfitting pins 156 and sockets 158. The pins 156 are designed for insertable reception within sockets 158 in a friction or snap fit fashion so as to secure divider members 150 together. In order to assure proper securement and complete attachment and further to assure that a continuous uninterrupted surface is provided by arch-shaped base 132, the connection rim 154 includes an extending lip 157 and an adjacent recess 159. The lip 157 of one divider member 150 is received into the recess 159 of the other divider member so as to assure complete interfitting locking engagement between divider members 150.

Figure 5:
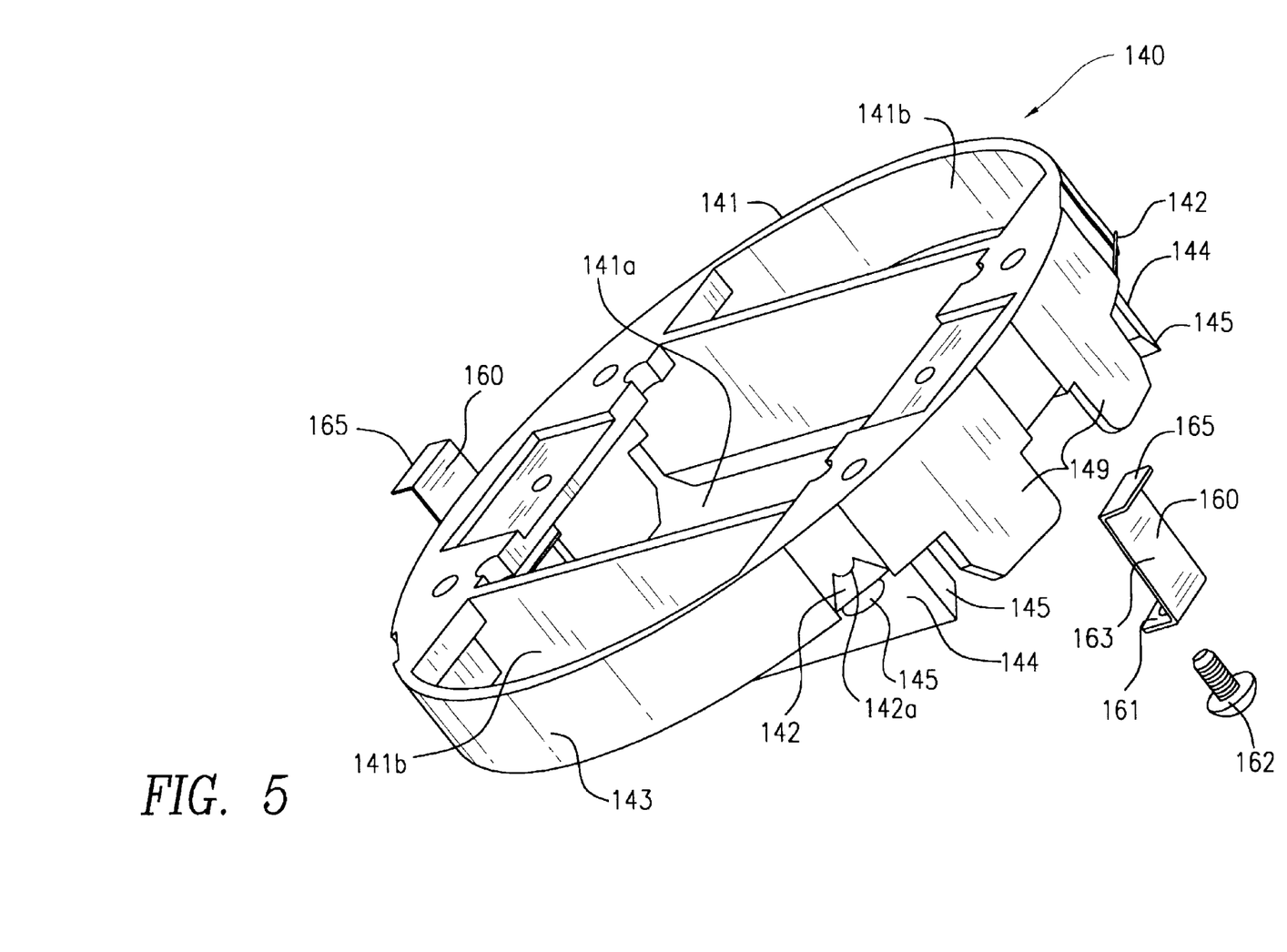
FIG. 5 is a top perspective view of the activation ring of the floor box assembly of FIG. 3.

Referring now to FIGS. 3, 4 and 5, divider 130 of the present embodiment is used with an improved activation ring assembly 140. Activation ring 140 is substantially similar to activation ring assembly 40 shown with respect to FIG. 2 and is designed to support electrical termination devices such as power receptacles and data/communication jacks and plugs. Activation ring assembly 140 includes an activation ring 141 which is typically formed of metal, preferably die cast zinc. The ring 141 is of general annular configuration and is designed to fit in frictional retention to the circular open upper end 18 of floor box housing 12. Ring 141 defines a central compartments 141a for accommodating and supporting a power receptacles, and a pair of lateral compartments 141b for accommodating data/communication terminations. The ring supports a plurality of circumferentially spaced wedge clips 142. Wedge clips 142 which are typically formed of stainless steel may be secured to the side wall 143 of activation ring 141 by attachment with screws 145. Wedge clips 142 include outwardly extending clip teeth 142a which are designed to dig into the cylindrical side wall 16 of floor box housing 12. As described with respect to FIGS. 1 and 2, wedge clips 142 provide permanent securement of activation ring 141 to the cylindrical wall of box housing 12.

Activation ring 141 further supports a pair of diametrically opposed Z-clips 160. Z-clips 160 each include an inwardly directed lower lip 161 which provides support of Z-clips 160 to ring 141 by screws 162, an upwardly extending wall 163 and outwardly extending upper lip 165 at the distal end thereof. Z-clips 160 are provided so that when activation ring 141 is inserted into the open upper end 18 of floor box housing 12, the outwardly extending lip 165 engages the upper edge of cylindrical side wall 16 positionally supporting the activation ring 141 within the floor box housing 12 at the upper extent thereof as will be described in further detail hereinbelow. Activation ring assembly 140 further includes a pair of spaced apart vertical walls 144 depending from activation ring 141. Depending walls 144 extend for overlapping engagement with the upper extents of vertical walls 134 of divider 130 when divider 130 is placed in housing 12. The depending walls 144 of ring 141 and vertical walls 134 of divider 130 provide continuous division of the floor box interior 19 from the open upper end 18 thereof to the archshaped base 132 of divider 130. In order to assure proper positioning of the vertical divider walls 134 with respect to activation ring 141, the distal extends of depending vertical walls 144 include inwardly tapered edges 145. Thus, upon insertion of ring 141, the upper ends 133 of vertical walls 134 engage the tapered extents 145 of depending walls 144 so as to guide the upper ends 133 into an interior position between depending walls 144. In order to accommodate such positioning, the vertical walls 134 are inwardly recessed at the lower ends 135 thereof adjacent base 132. This maintains the width of base 132 so as to accommodate wires inserted therearound and also permits the upper ends 133a of vertical walls 134 to be positioned between depending walls 144 of ring 141. Furthermore, activation ring 141 includes two pairs of depending fingers 149 adjacent depending walls 144. The fingers 149 support the upper ends 133a of vertical walls 134 against depending walls 144 captively supporting vertical walls 134 and insuring proper position of the activation ring 141 with respect thereto. The interfitting of upper ends 133a of vertical walls 134 between depending walls 144 and fingers 149 assure that the walls 134 will be rigidly held and will not bow either inwardly or outwardly.

Having described the components of the present invention, the use of the present invention may be described with respect to the preferred embodiment of FIGS. 3–6.

The floor box housing 12 is positioned onto an understructure of a floor which is to be constructed. Concrete is poured thereabout in conventional fashion. Once the floor is set, the upper end 16a of the cylindrical wall 16 may be cut to a desired height. The height selected is based upon the type of devices terminated by floor box assembly 10 as well as the type of floor covering employed over the poured floor. However, typically the wall 16 is cut substantially flush with the floor.

Power and data/communication wires may now be run into the interior 19 of floor box housing 12 through ports 22 and 24 located at the lower end thereof. As noted above, the present invention provides selectivity in that power and data/communication wires can be run through either of ports 22 or ports 24. Wires are brought up through the open upper end 18 of floor box housing 12 so that the ends of the wires may extend exteriorly of box housing 12.

Once the wires are pulled through housing 12, the divider 130 may be inserted into the interior 19 of floor box housing 12. The divider 130, with its divider members 150 assembled as shown in FIG. 3, is inserted into the interior 19 of box 12 in a manner which provides for clearance of the wires extending therefrom. In that regard, the arch-shaped base 132 forming divider 130 is provided with clearance with respect to the interior side wall 16 of floor box housing 12 so as to allow insertion of divider 130 into base housing 12 around the inserted wires. The divider 130 may be movably positioned within box housing 12 at this stage so as to accommodate various arrangements of wires extending thereinto. The divider 130 is inserted in such a manner that data/communication wires extending from selected ones of ports 20 are located within at least one region defined by the outer surfaces 134b of vertical walls 134 and the inner surface of cylindrical wall 16. The data/communication wires extend directly upwardly form the selected entry port through the open upper end 18 of box housing 12. If desirable, data/communication wires may be run through the other of ports 22, 24 and under arch-shaped base 132 through tunnel 136. The wires may be run between the opposite verticle wall 134 and cylindrical wall 16. Similarly, the power wires extending through the other of selected ports 20 are positioned over arch-shaped base 132 and are located between facing interior surfaces 132a of vertical walls 134. In this manner complete spacial separation is maintained between power wires and data/communication wires from the ports 20 through the open end 18 of box housing 12. Further, the tunnel 136 of divider 130 allows data/communication wires to be run from one box to an adjacent box by passage of wires from port to port through tunnel 136, while still maintaining separation with the power wires.

Prior to inserting divider 130 into box housing 12, the divider may be cut to the appropriate height. This is typically done by initially inserting the divider 130 into the housing 12, then marking the appropriate height. The divider 130 is removed and cut at the marked location. As can be clearly seen in FIGS. 3 and 4, divider 130 includes a plurality of horizontally extending vertically spaced score lines 137 located on vertical walls 134. Score lines 137 are positioned so that the upper ends 133 of vertical walls 134 may be cut to an appropriate height so as to be properly accommodated in floor box housing 12 which has also been cut to an appropriate height based upon the type of floor poured. The score lines 139 are spaced apart a sufficiently small distance to provide the installer with appropriate height adjustment. It is contemplated that the score lines 137 may form snap-off locations to allow the installer to snap-off the upper ends .133 of walls 134 at the appropriate height.

Figure 6:
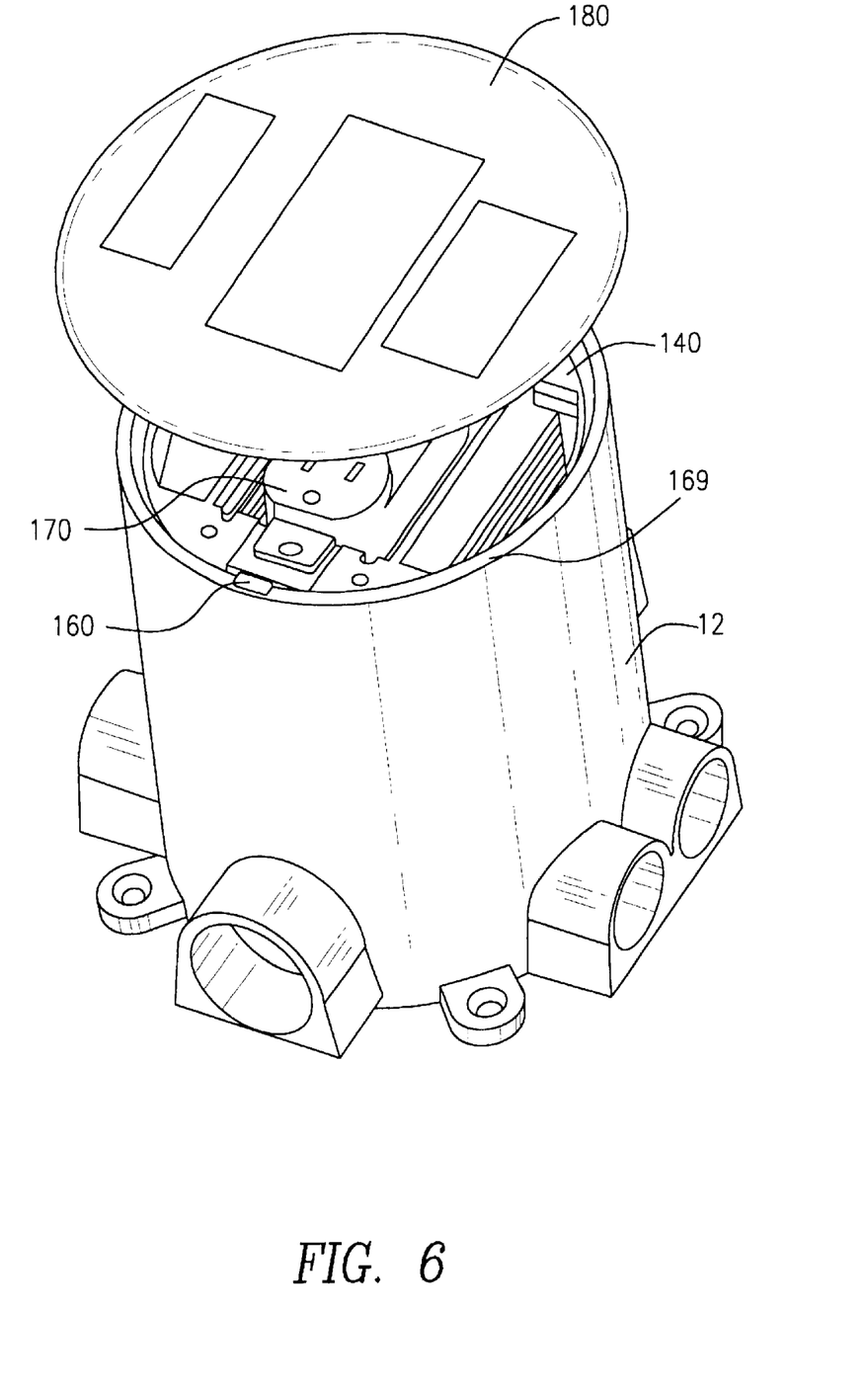
FIG. 6 is a top perspective view of the assembled floor box assembly of FIG. 3.

Once the divider is finally installed and positioned within the interior 19 of floor box housing 12, activation ring assembly 140 may be set within floor box housing 12. As shown in FIG. 6, the activation ring assembly 140 supports electrical power receptacles 170 mounted thereto and also supports an outlet cover 180 thereover. The wires may be run through the actuation ring 141 prior to positioning on the base housing. At this stage, the power receptacle 170 may be included on ring 141 and power wires terminated thereto. The activation ring assembly 140 may be set in the housing to depth where the outwardly extending upper lips 165 of the Z-clips 160 rest on the upper extent 16a of cylindrical wall 16. This assures the proper location of activation ring assembly with respect to housing 12. At this position, depending walls 144 overlap with the upper ends 133 of vertical walls 134 to provide continuous spacial separation between the power and data/communication wires from the activation ring 141 at the open upper end 18 of box 20 to the ports 20 at the lower end thereof. Upon setting the activation ring 141 in housing 12, the wedge clips 142 make biting engagement with the cylindrical side walls permanently affixing the activation ring assembly thereto. Thereafter, the remaining components such as data/communication jacks can be terminated and attached to the activation ring and/or the cover. Once positioned, while the receptacles and jacks can be removed and replaced within the activation ring assembly, the activation ring itself is non-removably positioned.

Various changes to the foregoing described and shown structures would now be evident to those skilled in the art. Accordingly, the particularly disclosed scope of the invention is set forth in the following claims.

What is claimed is:

1. An infloor electrical outlet box assembly for accommodating and separating power wires and data/communication wires comprising:

an outlet box positionable within a floor, said outlet box having a base, an opposed open end and a perimetrical side wall therebetween defining a box interior, said outlet box including a plurality of access ports through said side wall adjacent said base for providing separate entry of said power and said data/communication wires into the interior of said box;

a service divider movably insertable into said box interior, said service divider having an arch-shaped base defined by opposed upper and lower arch-shaped surfaces, said lower archshaped surface defining a tunnel selectively alignable, upon said movable insertion of service divider, with at least one of said access ports, said upper arch-shaped surface being alignable with another of said access ports for accommodating said power wires thereover; said service divider further including an upstanding divider wall extending from said arch-shaped base towards said open upper end of said box upon insertion thereinto for accommodating said data/communication wires between said divider wall and said box side wall, said divider positioned for providing separation between said power wires and said data/communication wires; and an activation member fixably positioned at the open end of said box for supporting power receptacles and data/communication receptacles for terminating said power wires and said data/communication wires; said activation member having a depending divider wall for positioning in side-by-side registration with a portion of said upstanding divider wall for maintaining separation between said power wires and said data/ communication wires and non-movably affixing the position of said service dividers in said box interior.

2. An infloor electrical outlet box assembly of claim 1 wherein said outlet box is generally in the shape of an open ended cylinder, wherein said base is generally circular and said side wall is cylindrical and wherein said activation member is generally in the form of a ring having a ring wall insertable against the interior of said cylindrical side wall.

3. An infloor electrical outlet box assembly of claim 2 wherein said ring wall of said activation ring includes a plurality of retaining clips extending therefrom for non-removable biting engagement with said interior of said cylindrical side wall.

4. An infloor electrical outlet box assembly of claim 3 wherein said service divider includes a pair of spaced apart divider walls extending upwardly from said arch-shaped base, so as to define a central compartment therebetween for accommodating said power wires, and a pair of lateral compartments between said divider walls and said cylindrical side wall for accommodating said data/communication wires.

5. An infloor electrical outlet box assembly of claim 4 wherein said activation ring includes a pair of spaced apart depending divider walls for positioning in side-by-side registration with a portion of said pair of upstanding divider walls.

6. An infloor electrical outlet box assembly of claim 5 wherein said activation ring includes means for supporting said power receptacle in alignment within said central compartment and said data/communication receptacles within said lateral compartments.

7. An infloor electrical outlet box assembly of claim 5 wherein said upstanding divider walls of said service divider extend internally of said depending divider walls at said activation ring.

8. An infloor electrical outlet box assembly of claim 4 wherein each of said upstanding divider walls includes a plurality of transversely extending longitudinal spaced score lines said score lines defining frangible locations for adjusting the length of said upstanding divider wall.

9. An infloor electrical outlet box assembly of claim 4 wherein said service divider includes:

a pair of detachably coupled divider members each divider member includes an arch-shaped component and one of said pair of upstanding divider walls extending from said arch-shaped component.

10. An infloor electrical outlet box assembly of claim 9 wherein each of said divided members is hermaphroditic.

11. An infloor electrical outlet box of claim 1 wherein said tunnel of said service divider is alignable with at least one of said access ports for permitting passage of said data/communication wires therethrough.

12. A service divider for placement in an electrical outlet box for maintaining separation between power and data/communication wires comprising:

a pair of hermaphroditic detachably coupled divider members; each divider member including an arch-shaped component and an upstanding divider wall, said arch-shaped component of one of said members being attachable to the arch-shaped component of the other divider member to form an arch-shaped base for passage of power wires thereabove, and further positioning said upstanding divider walls in parallel spaced apart relationship for passage of said power wires therebetween.

13. A service divider of claim 12 wherein each of said arch-shaped component includes an extending connection edge for mutual interconnection.

14. A service divider of claim 13 wherein said connection edge of each arch-shaped component includes interfitting connection structure for detachably coupling said divider members.

15. A service divider of claim 14 wherein said interfitting connection structure includes a mating pin and socket structure for snap fitting one of said arch-shaped components to the other arch-shaped component.

16. A service divider of claim 12 wherein said connection edge of each arch-shaped component includes an extending lip and an adjacent recess, said lip of said one arch-shaped component being accommodating in the recess of the other arch-shaped component.

* * * * *